US012222907B1

(12) United States Patent
Zhang et al.

(10) Patent No.: US 12,222,907 B1
(45) Date of Patent: Feb. 11, 2025

(54) METHOD, APPARATUS, DEVICE AND STORAGE MEDIUM FOR DATA PROCESSING

(71) Applicant: Beijing Volcano Engine Technology Co., Ltd., Beijing (CN)

(72) Inventors: Jiachen Zhang, Beijing (CN); Qiming Guan, Beijing (CN); Yongji Xie, Beijing (CN); Peng Li, Beijing (CN); Haiyu Wang, Beijing (CN); Sheng Zhao, Beijing (CN); Zewen Jin, Beijing (CN); Liming Wang, Beijing (CN); Tianci Zhang, Beijing (CN); Jinfeng Yang, Beijing (CN); Wen Chai, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/732,418

(22) Filed: Jun. 3, 2024

(30) Foreign Application Priority Data

Jul. 31, 2023 (CN) .......................... 202310953296.8

(51) Int. Cl.
*G06F 16/188* (2019.01)
*G06F 16/178* (2019.01)
(52) U.S. Cl.
CPC .......... *G06F 16/188* (2019.01); *G06F 16/178* (2019.01)
(58) Field of Classification Search
CPC .............................. G06F 16/188; G06F 16/178
See application file for complete search history.

(56) References Cited

U.S. PATENT DOCUMENTS 9,503,499 B1 11/2016 Donaldson
2013/0117229 A1* 5/2013 Jain .................... G06F 16/27
707/703

(Continued)

FOREIGN PATENT DOCUMENTS

CN 109445685 A 3/2019

OTHER PUBLICATIONS

Extended European Search Report for European Patent Application No. 24180261.0, mailed on Nov. 28, 2024, 9 pages.

(Continued)

*Primary Examiner* — Cam Y T Truong
(74) *Attorney, Agent, or Firm* — Astute IP Law Group

(57) ABSTRACT

Embodiments of the present disclosure provide a method, apparatus, device and storage medium for data processing. If a kernel module sends a data calling request to a userspace process, first modification time information and second modification time information of data corresponding to the data calling request are obtained by the userspace process. The first and second modification time information are used to indicate modification time information of the data in the kernel module and in a file service end, respectively. The first and second modification time information are compared by the userspace process. If the first and second modification time information are inconsistent, a verification invalidation result is returned to the kernel module. The data in the kernel module is invalidated by the kernel module according to the verification invalidation result. The data in the file service is synchronized by the userspace process to the kernel module.

15 Claims, 4 Drawing Sheets

(56) References Cited

U.S. PATENT DOCUMENTS

2015/0169497 A1 6/2015 Fried et al.
2020/0301884 A1* 9/2020 Eom .................... G06F 16/178

OTHER PUBLICATIONS

Tarasov et al., "Terra Incognita: On the Practicality of User-Space Files Systems", HotStorage' 15: Proceedings of the 7th USENIX Conference on Hot Topics in Storage and File Systems, Jul. 6, 2015, 5 pages.

* cited by examiner

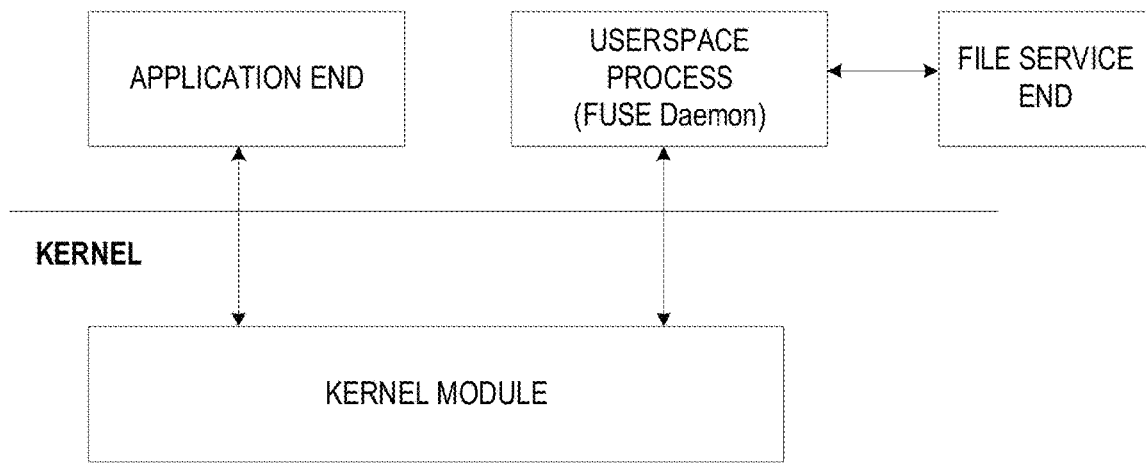

FIG. 1

IN RESPONSE TO THE KERNEL MODULE SENDING A DATA CALLING REQUEST TO THE USERSPACE PROCESS, OBTAIN, BY THE USERSPACE PROCESS, FIRST MODIFICATION TIME INFORMATION AND SECOND MODIFICATION TIME INFORMATION OF DATA CORRESPONDING TO THE DATA CALLING REQUEST, WHERE THE FIRST MODIFICATION TIME INFORMATION IS USED TO INDICATE MODIFICATION TIME INFORMATION OF THE DATA IN THE KERNEL MODULE, AND THE SECOND MODIFICATION TIME INFORMATION IS USED TO INDICATE MODIFICATION TIME INFORMATION OF THE DATA IN A FILE SERVICE END — S201

COMPARE, BY THE USERSPACE PROCESS, THE FIRST MODIFICATION TIME INFORMATION WITH THE SECOND MODIFICATION TIME INFORMATION, AND IN RESPONSE TO THE FIRST MODIFICATION TIME INFORMATION AND THE SECOND MODIFICATION TIME INFORMATION BEING INCONSISTENT, RETURN A VERIFICATION INVALIDATION RESULT TO THE KERNEL MODULE — S202

INVALIDATE, BY THE KERNEL MODULE, THE DATA IN THE KERNEL MODULE, ACCORDING TO THE VERIFICATION INVALIDATION RESULT, AND SYNCHRONIZE, BY THE USERSPACE PROCESS, THE DATA IN THE FILE SERVICE END TO THE KERNEL MODULE — S203

FIG. 2

METHOD, APPARATUS, DEVICE AND STORAGE MEDIUM FOR DATA PROCESSING

CROSS REFERENCE

The present application claims priority to Chinese Patent Application No. 202310953296.8 filed on Jul. 31, 2023 and entitled "METHOD, APPARATUS, DEVICE AND STORAGE MEDIUM FOR DATA PROCESSING", which is incorporated herein by reference in its entirety.

FIELD

Embodiments of the present disclosure relate to the technical field of filesystem in userspace, and in particular, to a method, an apparatus, a device and a storage medium for data processing.

BACKGROUND

Currently, the filesystem in userspace (FUSE) is widely applied due to its low latency, high performance and strong compatibility. The filesystem in userspace may obtain data from the file service end, and may also obtain data from the kernel module, which needs to ensure that the data in the kernel module is consistent with the data in the file service end.

In the prior art, data may be synchronized periodically. The specific steps are as follows: first, setting a duration of a synchronization period, and in response to a distance from current time to last synchronization time is greater than the set duration of the synchronization period, synchronizing the data.

However, the inventor finds that the prior art has at least the following technical problems: if the duration of the synchronization period is set to be short, and the data is synchronized frequently, the system performance will be affected; if the duration of the synchronization period is set to be long, it is possible that data in the kernel module is inconsistent with data in the file service end because the data synchronization is not timely, and therefore the validity of the data in the kernel module is poor.

SUMMARY

Embodiments of the present disclosure provide a method, an apparatus, a device, and a storage medium for data processing, which may synchronize data in real time, thereby improving the validity of data in a kernel module.

In a first aspect, the embodiments of the present disclosure provide a method of data processing, the method being applied at a filesystem in userspace, the filesystem in userspace including a kernel module and a userspace process, the kernel module being configured to forward a data request of an application end to the userspace process, and the userspace process being configured to process the data request; the method comprising:

in response to the kernel module sending a data calling request to the userspace process, obtaining, by the userspace process, first modification time information and second modification time information of data corresponding to the data calling request, where the first modification time information is used to indicate modification time information of the data in the kernel module, and the second modification time information is used to indicate modification time information of the data in a file service end;

comparing, by the userspace process, the first modification time information with the second modification time information; in response to the first modification time information and the second modification time information being inconsistent, returning a verification invalidation result to the kernel module;

invalidating, by the kernel module, the data in the kernel module, according to the verification invalidation result, and synchronizing, by the userspace process, the data in the file service end to the kernel module.

In a second aspect, embodiments of the present disclosure provide an apparatus of data processing, the apparatus being applied at a filesystem in userspace, the filesystem in userspace including a kernel module and a userspace process, the kernel module being configured to forward a data request of an application end to the userspace process, and the userspace process being configured to process the data request; the apparatus comprising:

an obtaining module configured to in response to the kernel module sending a data calling request to the userspace process, obtain, by the userspace process, first modification time information and second modification time information of data corresponding to the data calling request, where the first modification time information is used to indicate modification time information of the data in the kernel module, and the second modification time information is used to indicate modification time information of the data in the file service end;

a verification module configured to compare, by the userspace process, the first modification time information with the second modification time information, and in response to the first modification time information and the second modification time information being inconsistent, return a verification invalidation result to the kernel module;

a processing module configured to invalidate, by the kernel module, the data in the kernel module, according to the verification invalidation result, and synchronize, by the userspace process, the data in the file service end to the kernel module.

In a third aspect, embodiments of the present disclosure provide an electronic device, comprises:

a processor, and a memory communicatively connected to the processor;

the memory storing computer executable instructions;

the processor executing the computer executable instruction stored by the memory to implement the method of data processing according to the first aspect.

In a fourth aspect, embodiments of the present disclosure provide a computer readable storage medium, where the computer readable storage medium stores computer executable instructions, the computer executable instructions, when executed by a processor, causing the processor to implement the method of data processing according to the first aspect.

In a fifth aspect, embodiments of the present disclosure provide a computer program product, including a computer program, the computer program, when executed by a processor, causing the processor to implement the method of data processing according to the first aspect.

Embodiments of the present disclosure provide a method, an apparatus, a device, and a storage medium for data processing, the method comprising: in response to the kernel module sending a data calling request to the userspace process, obtaining, by the userspace process, first modification time information and second modification time information of data corresponding to the data calling request, where the first modification time information is used to indicate modification time information of the data in the kernel module, and the second modification time information is used to indicate modification time information of the data in a file service end; comparing, by the userspace process, in response to the first modification time information and the second modification time information being inconsistent, returning a verification invalidation result to the kernel module; invalidating, by the kernel module, the data in the kernel module, according to the verification invalidation result, and synchronizing, by the userspace process, the data in the file service end to the kernel module. In embodiments of the present application, since after the data calling request is received, the validity of the data in the kernel module is verified, which in turn ensures that the data in the kernel module may be consistent with the data in the file service end, and the data calling request is real-time. That is, the consistency of the data may be verified in real time. Thus, it may ensure that the data in the kernel module may be consistent with the data in the file service end in real time, further the validity of the data in the kernel module may be improved.

BRIEF DESCRIPTION OF THE DRAWINGS

In order to more clearly illustrate the technical solutions in the embodiments of the present disclosure or in the prior art, the following will briefly introduce the accompanying drawings that need to be used in the description of the embodiments or the prior art. It will be obvious that the accompanying drawings in the following description are some of the embodiments of the present disclosure. For the person of ordinary skill in the art, other accompanying drawings may also be obtained according to these drawings, without creative efforts.

FIG. 1 is a schematic diagram of an application scenario of a method of data processing according to embodiments of the present disclosure;

FIG. 2 is a flowchart of a method of data processing according to embodiments of the present disclosure;

DETAILED DESCRIPTION

Figure 3:
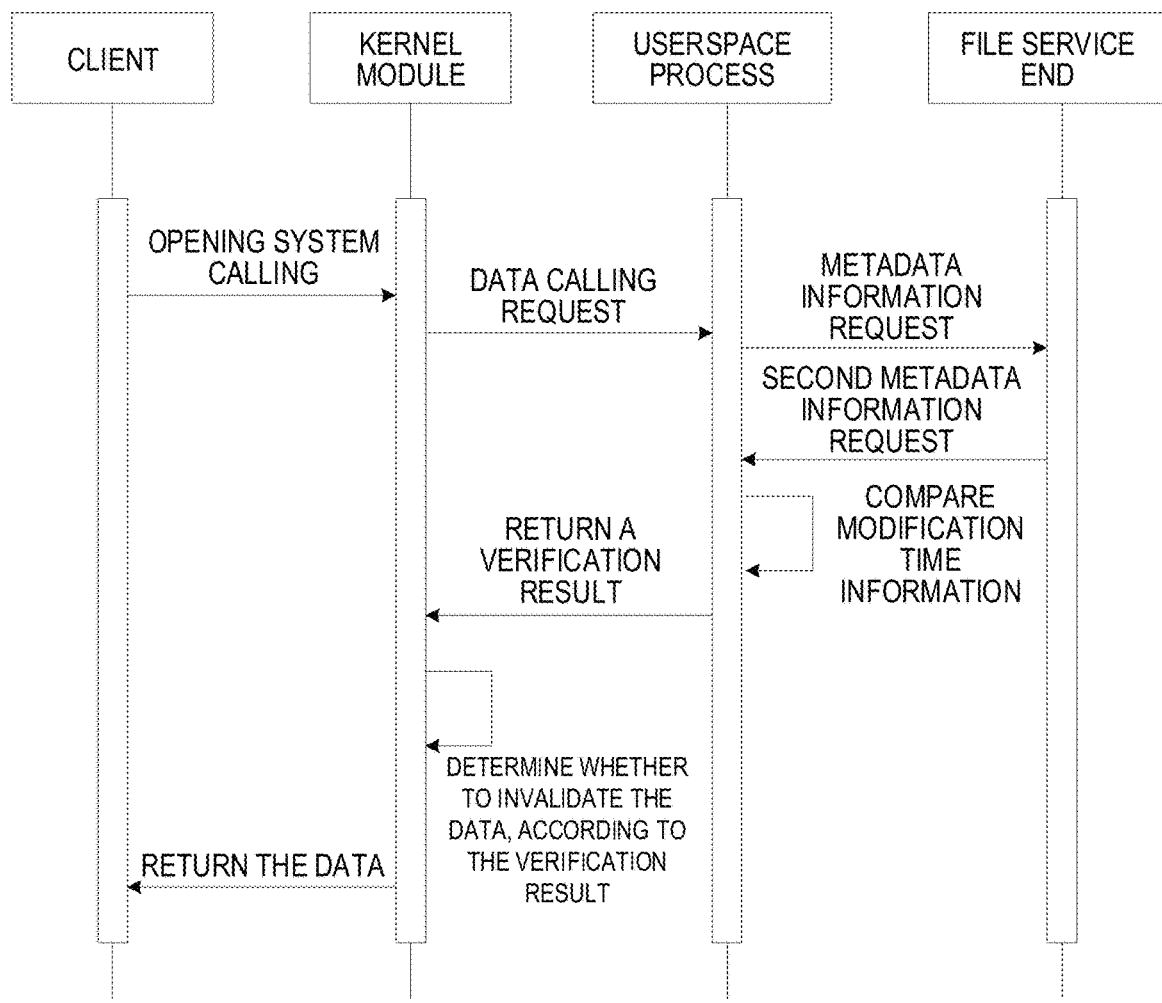
FIG. 3 is a schematic diagram of a method of data processing according to embodiments of the present disclosure.

In order to make the purposes, technical solutions and advantages of the embodiments of the present disclosure more apparent, the technical solutions in the embodiments of the present disclosure will be described clearly and completely in the following in connection with the accompanying drawings in the embodiments of the present disclosure. It is obvious that the described embodiments are only a part of the embodiments of the present disclosure, and not all of the embodiments. All other embodiments obtained by persons of ordinary skill in the art based on the embodiments of the present disclosure without creative efforts fall within the scope of protection of the present disclosure.

It should be noted that, the user information (including, but not limited to, user equipment information, user personal information, and/or the like) and data (including, but not limited to, data used for analysis, stored data, displayed data, and/or the like) involved in the present application are information and data that are authorized by the user or be fully authorized by each party, and that the collection, use and processing of the relevant data need to comply with the relevant laws, regulations and standards, and that the relevant operation entry is provided for the user to choose authorization or rejection.

Currently, the Filesystem in Userspace (FUSE) is widely applied due to low latency, high performance and strong compatibility. The filesystem in userspace may obtain data from the file service end, and may also obtain data from the kernel module, which needs to ensure that the data in the kernel module is consistent with the data in the file service end.

In the prior art, data may be synchronized periodically. The specific steps are as follows: first, setting a duration of a synchronization period, and in response to a distance from current time to last synchronization time is greater than the set duration of the synchronization period, synchronizing the data. However, if the duration of the synchronization period is set to be short, and data is synchronized frequently, the system performance will be affected; if the duration of the synchronization period is set to be long, it is possible that data in the kernel module is inconsistent with data in the file serving end because the data synchronization is not timely, therefore the validity of the data in the kernel module is poor.

It can be seen that how to keep the data in the kernel module consistent with the data in the file service end to improve the validity of the data in the kernel module is a problem to be solved urgently at present.

In order to solve the above problem, the present embodiment provides the following technical concept: first, in response to a kernel module sending a data calling request to a userspace process, obtaining, by the userspace process, first modification time information and second modification time information of data corresponding to the data calling request, where the first modification time information is used to indicate modification time information of the data in the kernel module, and the second modification time information is used to indicate modification time information of the data in a file service end; then, comparing, by the userspace process, the first modification time information with the second modification time information, in response to the first modification time information and the second modification time information being inconsistent, returning a verification invalidation result to the kernel module; finally, invalidating, by the kernel module, the data in the kernel module, according to the verification invalidation result. As the validity of the data in the kernel module is verified in a case that the data calling request is received, it may ensure that the data in the kernel module is consistent with the data in the file service end, and the data calling request is real-time. That is, the consistency of the data may be verified in real time, so that the invalid data in the filesystem in userspace may be deleted in time, thereby improving the processing efficiency of the filesystem in userspace.

Application scenarios of the embodiments of the present disclosure will be explained below:

A method of data processing according to the embodiments of the present disclosure may be applied in a scenario of performing consistency processing on the data. FIG. 1 is a schematic diagram of an application scenario of a method of data processing according to embodiments of the present disclosure. As shown in FIG. 1, the method of data processing may be applied in a filesystem in userspace. The filesystem in userspace comprises a kernel module and a userspace process (which may be represented as a FUSE Daemon), where the kernel module is configured to forward a data request of an application end to the user process, and the user process is configured to process the data request. Herein, the userspace process may obtain data from the file service end, and may also obtain data from the kernel module. The method may synchronize the data in the kernel module and the data in the file service end, thus ensuring that the data obtained by the userspace process from the kernel module and from the file service end are consistent. The method of data processing according to embodiments of the present disclosure will be described in detail below using detailed embodiments.

FIG. 2 is a flowchart of a method of data processing according to embodiments of the present disclosure. The method may also be applied at a filesystem in userspace. The filesystem in userspace comprises a kernel module and a userspace process, where the kernel module is configured to forward a data request of an application end to the userspace process, and the userspace process is configured to process the data request. As shown in FIG. 2, the method includes:

In S201, in response to the kernel module sending a data calling request to the user process, first modification time information and second modification time information of data corresponding to the data calling request is obtained by the userspace process, where the first modification time information is used to indicate modification time information of the data in the kernel module, and the second modification time information is used to indicate modification time information of the data in a file service end.

In embodiments of the present disclosure, in a case that the kernel module receives an opening calling instruction of the client, the kernel module sends a data calling request to the userspace process. For example, as shown in FIG. 3, the client sends an opening system calling instruction to the kernel module, and the kernel module sends a data calling request to the user process. Herein, the data calling request may be a FUSE_OPEN protocol request.

Alternatively, the first modification time information is in first metadata information in the kernel module, and the second modification time information is in second metadata information in the file service end. Accordingly, this step includes: in response to the kernel module sending the data calling request to the userspace process, obtaining, by the userspace process, the first modification time information of the data corresponding to the data calling request, from the first metadata information stored locally, and obtaining, by the userspace process, the second modification time information of the data corresponding to the data calling request, from the second metadata information stored in the file service end. Alternatively, the first modification time information may be represented by $mtime_1$, and the second modification time information may be represented by $mtime_2$.

In some embodiments, the userspace process may obtain the second modification time information by sending a metadata information request to the file service end. Accordingly, as shown in FIG. 3, obtaining, by the userspace process, the second modification time information of the data corresponding to the data calling request from the second metadata information stored in the file service end includes: sending, by the userspace process, the metadata information request of the data to the file service end to cause the file service end to return the second metadata information of the data corresponding to the data calling request to the userspace process, according to the metadata information request; and the userspace process obtaining, from the second metadata information, the second modification time information of the data corresponding to the data calling request.

In S202, the first modification time information is compared by the userspace process with the second modification time information; and if the first modification time information and the second modification time information is inconsistent, a verification invalidation result is returned to the kernel module.

In the embodiment of the present disclosure, if the first modification time information and the second modification time information are consistent, a verification validity result is returned to the kernel module.

In S203, the data in the kernel module is invalidated by the kernel module according to the verification invalidation result, and the data in the file service end is synchronized by the userspace process to the kernel module.

In some embodiments, this step is as follows: invalidating, by the kernel module, the data in the kernel module, according to the verification invalidation result; obtaining, by the userspace process, the data from the file service end; and synchronizing, by the userspace process, the data in the file service end to the kernel module.

In embodiments of the disclosure, the invalidation of the data in the kernel module may include a plurality of ways. In some embodiments, invalidating, by the kernel module, the data in the kernel module, according to the verification invalidation result includes: determining, by the kernel module, the invalidation data in the kernel module, according to the verification invalidation result, and deleting the invalidation data in the kernel module.

It should be noted that in a case where a verification validation result is returned by the userspace process to the kernel module, then in this case, it is determined by the kernel module, according to the verification validation result, that the data in the kernel module is valid and the data is called by the userspace process from the kernel module.

In the method of data processing provided in this embodiment, as the validity of the data in the kernel module is verified in a case that the data calling request is received, thereby it is ensured that the data in the kernel module may be consistent with the data in the file service end, and the data calling request is real-time, that is, the consistency of the data may be verified in real time. This may ensure that the data in the kernel module may be consistent with the data in the file service end in real time, which improves the validity of the data in the kernel module.

Figure 4:
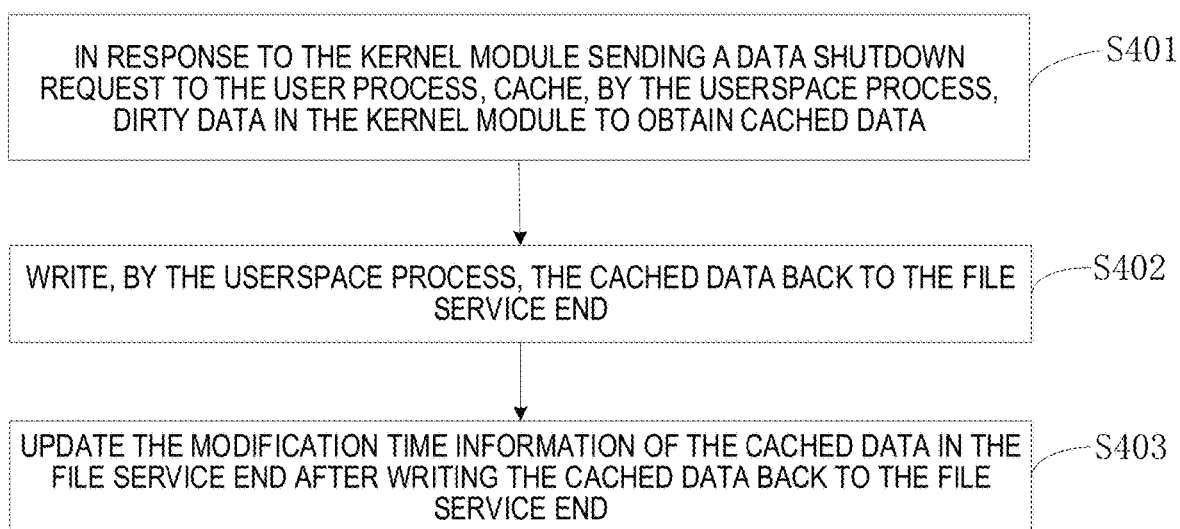
FIG. 4 is a flowchart of another method of data processing according to embodiments of the present disclosure.

FIG. 4 is a flowchart of another method of data processing according to embodiments of the present disclosure. On the basis of the embodiments of FIG. 2, the present application also synchronizes the data in the case that the data is shutdown. As shown in FIG. 4, the method includes:

In S401, in response to the kernel module sending a data shutdown request to the user process, dirty data in the kernel module may be cached by the userspace process to obtain cached data.

Figure 5:
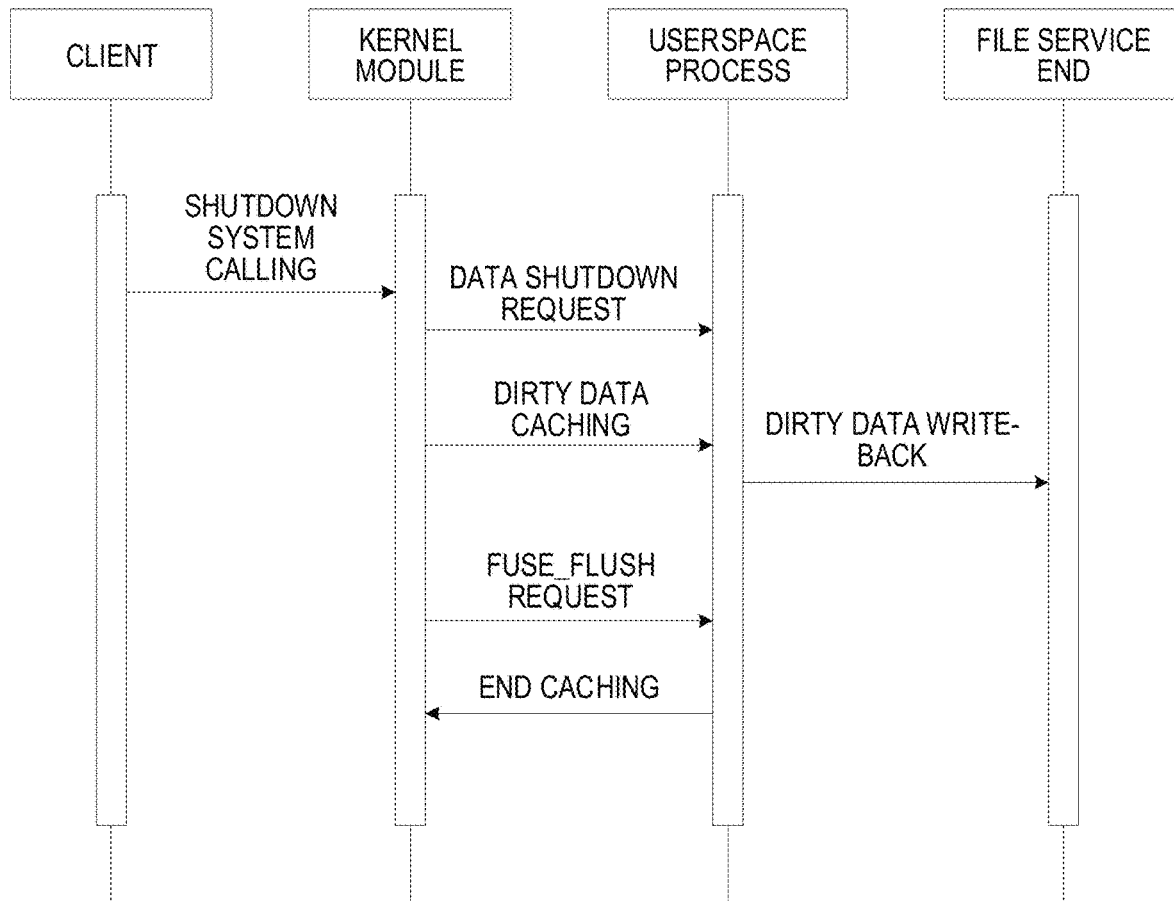
FIG. 5 is a schematic diagram of another method of data processing according to embodiments of the present disclosure.

In embodiment of the present disclosure, a data shutdown request is sent to the userspace process upon a shutdown calling instruction from the client received by the kernel module. For example, as shown in FIG. 5, the shutdown calling instruction sent by the client to the kernel module may be system shutdown calling. The data shutdown request sent by the kernel module to the userspace process may be a FUSE_WRITE request, and the userspace process caches the dirty data in the kernel module, according to the FUSE_WRITE request. In some embodiments, the dirty data is new data after the data corresponding to the data calling request is modified.

It should be noted that, after the caching of the dirty data in the kernel module is ending, the kernel module may generate a cache ending request to the userspace process to stop the caching. Accordingly, the specific steps are as follows: in response to the kernel module sending a cache ending request to the userspace process, the userspace process determining that dirty data in the kernel module is written back completely, and ending the cache.

For example, as shown in FIG. 5, the cache ending request may be a FUSE_FLUSH request.

In S402, the cached data back is written by the userspace process to the file service end.

It should be noted that, after writing the cached data back to the file service end, the modification time information in the metadata information of the written-back data may also be updated. Accordingly, the method further comprises:

In S403, the modification time information of the cached data in the file service end is updated after the cached data back is written to the file service end.

In the embodiments of the present disclosure, the kernel module sends a data shutdown request to the userspace process, the dirty data in the kernel module is cached by the userspace process, and written back to the file service end, and thereby it is ensured that the data in the kernel module may be consistent with the data in the file service end, and the data shutdown request is real-time. That is, the consistency of the data may be verified in real time, which improves the validity of the data in the file service end.

Figure 6:
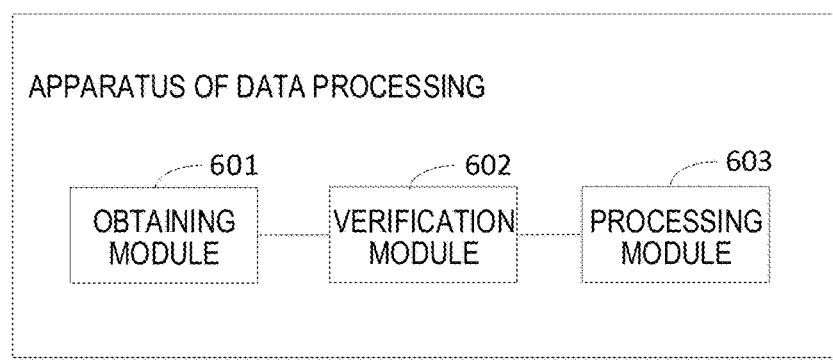
FIG. 6 is a structural block diagram of an apparatus of data processing according to embodiments of the present disclosure.

FIG. 6 is a structural block diagram of an apparatus of data processing according to embodiments of the present disclosure, which is applied at a filesystem in userspace. The filesystem in userspace includes a kernel module and a userspace process, the kernel module is configured to forward a data request of an application end to the userspace process, and the userspace process is configured to process the data request. Referring to FIG. 6, the apparatus of data processing includes: an obtaining module 601, a verification module 602, and a processing module 603.

The obtaining module 601 is configured to, in response to the kernel module sending a data calling request to the userspace process, obtain, by the userspace process, first modification time information and second modification time information of data corresponding to the data calling request, where the first modification time information is used to indicate modification time information of the data in the kernel module, and the second modification time information is used to indicate modification time information of the data in a file service end;

The verification module 602 is configured to compare, by the userspace process, the first modification time information with the second modification time information, and in response to the first modification time information and the second modification time information being inconsistent, return a verification invalidation result to the kernel module;

The processing module 603 is configured to invalidate, by the kernel module, the data in the kernel module, according to the verification invalidation result, and synchronize, by the userspace process, the data in the file service end to the kernel module.

According to one or more embodiments of the present disclosure, in response to the kernel module sending the data calling request to the userspace process, the obtaining module 601 obtains, by the userspace process, the first modification time information and the second modification time information of data corresponding to the data calling request, specifically including: in response to the kernel module sending a data calling request to the userspace process, obtaining, by the userspace process, the first modification time information of the data corresponding to the data calling request from first metadata information stored locally; and obtaining, by the userspace process, the second modification time information of the data corresponding to the data calling request from second metadata information stored in the file service end.

According to one or more embodiments of the present disclosure, the obtaining module 601 obtains, by the userspace process, the second modification time information of the data corresponding to the data calling request from the second metadata information stored in the file service end, specifically including: sending, by the userspace process, a metadata information request of the data to the file service end, so that the file service end returns the second metadata information of the data corresponding to the data calling request, to the userspace process, according to the metadata information request; and obtaining, by the userspace process, the second modification time information of the data corresponding to the data calling request, from the second metadata information.

According to one or more embodiments of the present disclosure, the verification module 602 is further configured to in response to the first modification time information being consistent with the second modification time information, return a verification validation result to the kernel module; determine, by the kernel module, that the data in the kernel module is valid, according to the verification validation result, and call, by the userspace process, the data from the kernel module.

According to one or more embodiments of the present disclosure, the apparatus further includes: a write-back module; and the write-back module is configured to in response to a kernel module sending a data shutdown request to a userspace process, cache, by the userspace process, dirty data in the kernel module and obtaining cached data; and write, by the userspace process, the cached data back to the file service end.

According to one or more embodiments of the present disclosure, the apparatus further includes: an updating module; and the updating module is configured to update the modification time information of the cached data in the file service end after the cached data back is writted to the file service end.

According to one or more embodiments of the present disclosure, the write-back module is further configured to: in response to the kernel module sending a cache ending request to the userspace process, determine, by the userspace process, that the dirty data in the kernel module is written back completely, and ending the caching.

According to one or more embodiments of the present disclosure, the dirty data is new data after the data corresponding to the data calling request is modified.

The obtaining module 601, the verification module 602, and the processing module 603 are connected in sequence. The apparatus of data processing provided in this embodiment may execute the technical solutions of the foregoing method embodiments, which are similar in terms of implementation principles and technical effects, and this embodiment will not be repeated herein.

Figure 7:
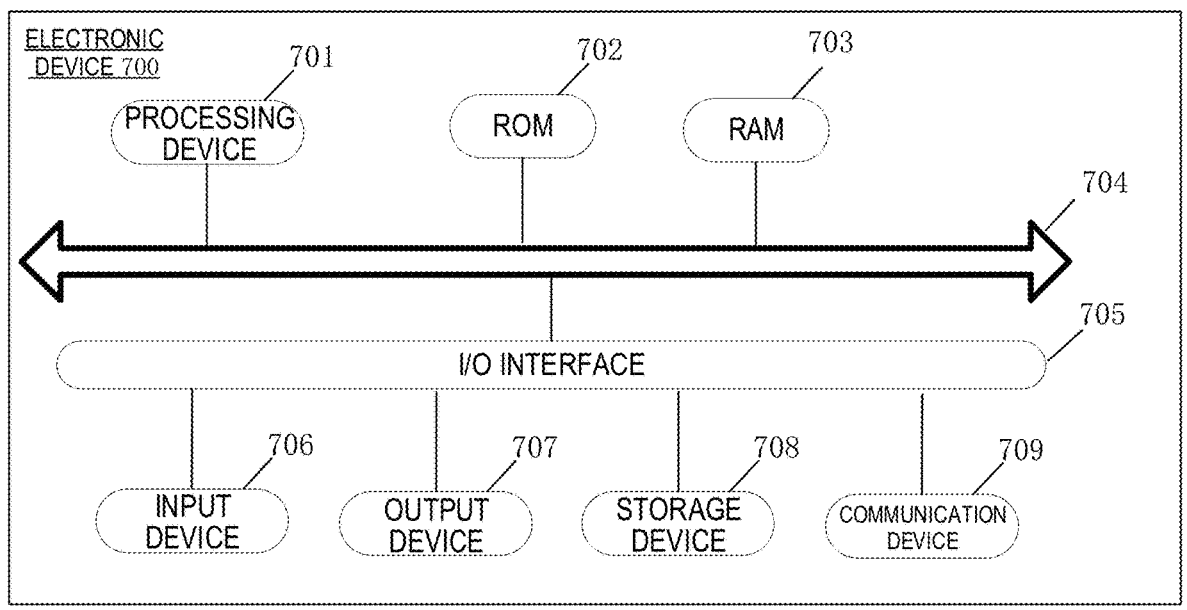
FIG. 7 is a schematic diagram of a hardware structure of an electronic device according to embodiments of the present disclosure.

FIG. 7 is a schematic diagram of a hardware structure of an electronic device according to embodiments of the present disclosure. Referring to FIG. 7, the electronic device 700 may be a terminal device or a server. Herein, the terminal device may include, but is not limited to, a mobile terminal such as a mobile phone, a laptop computer, a digital broadcast receiver, a personal digital assistant (PDA), a portable android device (PAD), a portable media player (PMP), a vehicle-mounted terminal (for example, a vehicle-mounted navigation terminal), and the like, and a fixed terminal such as a digital TV, a desktop computer, and the like. The electronic device shown in FIG. 7 is only an example and should not bring any limitation to the functions and scope of use of embodiments of the present disclosure.

As shown in FIG. 7, the electronic device 700 may include a processing device (e.g., a central processing unit, a graphics processor, etc.) 701 that may perform various suitable actions and processes in accordance with a program stored in a read only memory (ROM) 702 or a program loaded into a random access memory (RAM) 703 from a storage device 708. A plurality of programs and data necessary for the operation of the electronic device 700 are also stored in the RAM 703. The processing device 701, the ROM 702, and the RAM 703 are connected to each other via a bus 704. An input/output (I/O) interface 705 is also connected to the bus 704.

In general, the following devices may be connected to the I/O interface 705: an input device 706 including, for example, a touch screen, a touch pad, a keyboard, a mouse, a camera, a microphone, an accelerometer, a gyroscope, and the like; an output device 707 including, for example, a liquid crystal display (LCD), a speaker, a vibrator, and the like; the storage device 708 including, for example, a magnetic tape, a hard disk, and the like; and a communication device 709. The communication device 709 may allow the electronic device 700 to communicate in wireless or wired ways with other device to exchange data. While FIG. 7 illustrates the electronic device 700 having various devices, it should be understood that it is not required to implement or have all of the illustrated devices. More or fewer device s may alternatively be implemented or provided.

In particular, according to embodiments of the present disclosure, the processes described above with reference to the flowcharts may be implemented as computer software programs. For example, embodiments of the present disclosure include a computer program product including a computer program carried on a computer readable medium. The computer program comprises a program code for performing the method as shown in the flowchart. In such embodiments, the computer program may be downloaded and installed from the network through the communication device 709, or installed from the storage device 708, or installed from the ROM 702. When the computer program is executed by the processing device 701, the above-described functions defined in the method are performed, according to embodiments of the present disclosure.

It should be noted that the computer readable medium described above in the present disclosure may be a computer readable signal medium or a computer readable storage medium, or any combination of the above. The computer-readable storage medium may be, for example, but is not limited to, an electronic, magnetic, optical, electromagnetic, infrared, or semiconductor system, apparatus, or device, or any suitable combination of the above. More specific examples of the computer readable storage medium may include, but are not limited to, an electrical connection having one or more cables, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, a computer readable storage medium may be any tangible medium that may contain or store a program that may be used by or in combination with an instruction execution system, apparatus, or device. While in the present disclosure, a computer readable signal medium may include a data signal propagated in a baseband or as part of a carrier wave carrying computer readable program code. Such propagated signals may take a variety of forms, including, but not limited to, electromagnetic signals, optical signals, or any suitable combination of the above. The computer readable signal medium may also be any computer readable medium, other than a computer readable storage medium, which transmits, propagates or communicates a program for use by or in connection with an instruction-executing system, apparatus or device. The program code included in the computer readable medium may be transmitted by any suitable medium, including, but not limited to: a cable, an optical fiber, RF (radio frequency), etc., or any other means.

The above computer readable medium may be included in the above electronic device, or may exist separately and not be installed in the electronic device.

The above computer readable medium carries one or more programs, and when the one or more programs are executed by the electronic device, the one or more programs cause the electronic device to execute the method shown in the above embodiments.

Computer program code for performing the operations of the present disclosure may be written in one or more programming languages or combinations thereof, including an object-oriented programming language such as Java, Smalltalk, C++ and/or the like and conventional procedural programming languages, such as the "C" language or similar programming languages. The program code may be executed entirely on the user's computer, partly on the user's computer, as a stand-alone software package, partly on the user's computer and partly on a remote computer or entirely on the remote computer or server. In the case involving a remote computer, the remote computer may be connected to the user's computer through any type of network, including a local area network (LAN) or a wide area network (WAN), or connected to an external computer (for example, over the Internet via an Internet service provider).

The flowcharts and block diagrams in the accompanying drawings illustrate the architecture, functionality and operation of systems, methods and computer program products that may be implemented according to various embodiments of the present disclosure. In this regard, each block in the flowchart or block diagrams may represent a module, a program segment, or a portion of code, which comprises one or more executable instructions for implementing the specified logical function(s). It should also be noted that, in some alternative implementations, the functions noted in the blocks may occur in a different order than that noted in the accompanying drawings. For example, two consecutively represented blocks may actually be executed substantially in parallel, and they may sometimes be executed in a reverse order, depending upon the functionality involved. It should also be noted that each block in the block diagrams and/or flowchart, and combinations of the blocks in the block diagrams and/or flowcharts, may be implemented with a dedicated hardware-based system that performs the specified function or operation, or may be implemented with a combination of dedicated hardware and computer instructions.

The units described in the embodiments of the present disclosure may be implemented by software or hardware. Herein, the name of the unit does not constitute a limitation to the unit itself in some cases. For example, the first obtaining unit may also be described as "a unit to obtain at least two internet protocol addresses".

The functions described herein above may be performed, at least in part, by one or more hardware logic components. For example, without limitation, example types of hardware logic components that may be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and/or the like.

In the context of this disclosure, a machine-readable medium may be a tangible medium that may contain or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above. More specific examples of machine-readable storage medium would include an electrical connection based on one or more cables, a portable computer disk, a hard disk, a random access memory (RAM), a read-only memory (ROM), an erasable programmable read-only memory (EPROM or flash memory), an optical fiber, a convenient compact disc read-only memory (CD-ROM), an optical storage device, a magnetic storage device, or any suitable combination of the above.

In a first aspect, according to one or more embodiments of the present disclosure, a method of data processing is provided, applied at a filesystem in userspace, the filesystem in userspace including a kernel module and a userspace process, where the kernel module is configured to forward a data request of an application end to the userspace process, and the userspace process is configured to process the data request; the method including:

in response to the kernel module sending a data calling request to the userspace process, obtaining, by the userspace process, first modification time information and second modification time information of data corresponding to the data calling request, where the first modification time information is used to indicate modification time information of the data in the kernel module, and the second modification time information is used to indicate modification time information of the data in a file service end;

comparing, by the userspace process, the first modification time information with the second modification time information;

in response to the first modification time information and the second modification time information being inconsistent, returning a verification invalidation result to the kernel module;

invalidating, by the kernel module, the data in the kernel module, according to the verification invalidation result; and synchronizing, by the userspace process, the data in the file service end to the kernel module.

According to one or more embodiments of the present disclosure, in response to the kernel module sending the data calling request to the userspace process, obtaining, by the userspace process, the first modification time information and the second modification time information of the data corresponding to the data calling request includes: in response to the kernel module sending the data calling request to the userspace process, obtaining, by the userspace process, the first modification time information of the data corresponding to the data calling request, from first metadata information stored locally, and obtaining, by the userspace process, the second modification time information of the data corresponding to the data calling request, from second metadata information stored in the file service end.

According to one or more embodiments of the present disclosure, the obtaining, by the userspace process, the second modification time information of the data corresponding to the data calling request, from the second metadata information stored in the file service end includes: sending, by the userspace process, the metadata information request of the data to the file service end, to cause the file service end to return, according to the metadata information request, the second metadata information of the data corresponding to the data calling request to the userspace process; and obtaining, by the userspace process, the second modification time information of the data corresponding to the data calling request, from the second metadata information.

According to one or more embodiments of the present disclosure, the method further c: in response to the first modification time information being consistent with the second modification time information, returning a verification validation result to the kernel module; determining, by the kernel module, that the data in the kernel module is valid, according to the verification validation result; and calling, by the userspace process, the data from the kernel module.

According to one or more embodiments of the present disclosure, the method further includes: in response to the kernel module sending a data shutdown request to the userspace process, caching, by the userspace process, dirty data in the kernel module to obtain cached data; and writing, by the userspace process, the cached data back to the file service end.

According to one or more embodiments of the present disclosure, the method further includes: updating the modification time information of the cached data in the file service end after writing the cached data back to the file service end.

According to one or more embodiments of the present disclosure, the method further includes: in response to the kernel module sending a cache ending request to the userspace process, determining, by the user process, that the dirty data in the kernel module is written back completely; and ending the caching.

According to one or more embodiments of the present disclosure, the dirty data is new data after the data corresponding to the data calling request is modified.

In a second aspect, according to one or more embodiments of the present disclosure, an apparatus of data processing is provided, which is applied at a filesystem in userspace, the filesystem in userspace including a kernel module and a userspace process, where the kernel module is configured to forward a data request of an application end to the userspace process, and the userspace process is configured to process the data request; the apparatus including:
- an obtaining module configured to in response to the kernel module sending a data calling request to the userspace process, obtain, by the userspace process, first modification time information and second modification time information of data corresponding to the data calling request, where the first modification time information is used to indicate modification time information of the data in the kernel module, and the second modification time information is used to indicate modification time information of the data in a file service end;
- a verification module configured to compare, by the userspace process, the first modification time information with the second modification time information, and in response to the first modification time information and the second modification time information being inconsistent, return a verification invalidation result to the kernel module;
- a processing module configured to invalidate, by the kernel module, the data in the kernel module, according to the verification invalidation result, and synchronize, by the userspace process, the data in the file service end to the kernel module.

According to one or more embodiments of the present disclosure, in response to the kernel module sending the data calling request to the userspace process, the obtaining module obtains, by the userspace process, the first modification time information and the second modification time information of data corresponding to the data calling request, specifically including: in response to the kernel module sending a data calling request to the userspace process, obtaining, by the userspace process, the first modification time information of the data corresponding to the data calling request from first metadata information stored locally; and obtaining, by the userspace process, the second modification time information of the data corresponding to the data calling request from second metadata information stored in the file service end.

According to one or more embodiments of the present disclosure, the obtaining module obtains, by the userspace process, the second modification time information of the data corresponding to the data calling request from the second metadata information stored in the file service end, specifically including: sending, by the userspace process, a metadata information request of the data to the file service end, so that the file service end returns the second metadata information of the data corresponding to the data calling request to the userspace process, according to the metadata information request; obtaining, by the userspace process, the second modification time information of the data corresponding to the data calling request, from the second metadata information.

According to one or more embodiments of the present disclosure, the verification module is further configured to in response to the first modification time information being consistent with the second modification time information, return a verification validation result to the kernel module; determine, by the kernel module, that the data in the kernel module is valid, according to the verification validation result, and call, by the userspace process, the data from the kernel module.

According to one or more embodiments of the present disclosure, the apparatus further comprises: a write-back module; the write-back module configured to in response to a kernel module sending a data shutdown request to a userspace process, cache, by the userspace process, dirty data in the kernel module and obtaining cached data; write, by the userspace process, the cached data back to the file service end.

According to one or more embodiments of the present disclosure, the apparatus further comprises: an updating module; the updating module configured to update the modification time information of the cached data in the file service end after the cached data back is written to the file service end.

According to one or more embodiments of the present disclosure, the write-back module is further configured to: in response to the kernel module sending a cache ending request to the userspace process, the userspace process determining that the dirty data in the kernel module is written back completely, and ending the caching.

According to one or more embodiments of the present disclosure, the dirty data is new data after the data corresponding to the data calling request is modified.

In a third aspect, according to one or more embodiments of the present disclosure, an electronic device is provided, including: a processor, and a memory communicatively connected to the processor;
- the memory storing computer executable instructions;
- the processor executing the computer executable instructions stored by the memory to implement the method of data processing according to the above first aspect and various possible designs of the first aspect.

In a fourth aspect, according to one or more embodiments of the present disclosure, a computer readable storage medium is provided, the computer readable storage medium storing computer executable instructions, the computer executable instructions, when executed by a processor, causing the processor to implement the method of data processing according to the above first aspect and various possible designs of the first aspect.

In a fifth aspect, embodiments of the present disclosure provide a computer program product, the computer program product including a computer program, the computer program, when executed by a processor, causing the processor to implement the method of data processing according to the above first aspect and various possible designs of the first aspect.

The above description is only illustration of example embodiments of the present disclosure and the technical principles applied thereto. It should be understood by those skilled in the art that the scope of the disclosure involved in the present disclosure is not limited to the technical solution formed by the specific combination of the above technical features, but also covers other technical solutions formed by any combination of the above technical features or their equivalent features without departing from the above disclosed concept, for example, a technical solution formed by replacing the above-mentioned features and the technical features having similar functions as disclosed in the present disclosure (but not limited to those technical features) from each other.

In addition, although the operations are depicted in a particular order, this should not be understood as requiring that the operations are performed in the particular order shown or in a sequential order. Multitasking and parallel processing may be advantageous in certain circumstances. Likewise, although several specific implementation details are included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in a plurality of embodiments, either individually or in any suitable sub-combination.

Although the present subject matter has been described in language specific to structural features and/or methodological actions, it should be understood that the subject matter defined in the appended claims is not necessarily limited to the specific features or actions described above. Rather, the specific features and actions described above are only example forms of implementing the claims.

What is claimed is:

1. A method of data processing, the method being applied at a filesystem of a computer system in userspace, the method comprising:
   sending, by the computer system, a data calling request of an application end to a kernel module to process the data calling request, wherein the filesystem in the userspace includes the kernel module and a userspace process;
   in response to the kernel module, forwarding the data calling request to the userspace process;
   in response to the forwarding the data calling request, obtaining, by the userspace process, first modification time information of data corresponding to the data calling request from a first metadata information stored locally and second modification time information of the data corresponding to the data calling request from second metadata information stored in a file service end, wherein the first modification time information indicates modification time information of data in the kernel module, and the second modification time information indicates modification time information of data in the file service end;
   comparing, by the userspace process, the first modification time information with the second modification time information;
   in response to the first modification time information and the second modification time information being inconsistent based on the comparing, returning a verification invalidation result to the kernel module;
   invalidating, by the kernel module, the data in the kernel module, according to the verification invalidation result;
   deleting, by the kernel module, the invalidated data in the kernel module;
   in response to the first modification time information being consistent with the second modification time information, returning a verification validation result to the kernel module;
   determining, by the kernel module, that data in the kernel module is valid according to the verification validation result;
   synchronizing, by the userspace process using the valid data, the data in the file service end to the kernel module; and
   in response to the kernel module sending a data shutdown request to the userspace process, caching dirty data to obtain cached data and updating the second modification time information of the cached data in the file service end after writing the cached data back to the file service end.

2. The method of claim 1, wherein obtaining, by the userspace process, the second modification time information of the data corresponding to the data calling request, from the second metadata information stored in the file service end comprises:
   sending, by the userspace process, a metadata information request of data to the file service end, to cause the file service end to return, according to the metadata information request, the second metadata information of the data corresponding to the data calling request to the userspace process; and
   obtaining, by the userspace process, the second modification time information of the data corresponding to the data calling request, from the second metadata information.

3. The method of claim 1, further comprising:
   calling, by the userspace process, data from the kernel module.

4. The method of claim 1, further comprising:
   in response to the kernel module sending a data shutdown request to the userspace process, caching, by the userspace process, the dirty data in the kernel module to obtain cached data; and
   writing, by the userspace process, the cached data back to the file service end.

5. The method of claim 4, further comprising:
   in response to the kernel module sending a cache ending request to the userspace process, determining, by the userspace process, that the dirty data in the kernel module is written back completely; and
   ending the caching.

6. The method of claim 4, wherein the dirty data is new data after the data corresponding to the data calling request is modified.

7. An electronic device, comprises:
   a processor, and a memory communicatively connected to the processor;
   the memory storing computer executable instructions;
   the processor executing the computer executable instructions stored by the memory to perform acts comprising:
   sending a data calling request of an application end to a kernel module to process the data calling request, wherein a filesystem in a userspace includes the kernel module and a userspace process;
   in response to the kernel module, forwarding the data calling request to the userspace process;
   in response to the forwarding the data calling request, obtaining, by the userspace process, first modification time information of data corresponding to the data calling request from a first metadata information stored locally and second modification time information of the data corresponding to the data calling request from second metadata information stored in a fie service end, wherein the first modification time information indicates modification time information of data in the kernel module, and the second modification time information indicates modification time information of data in the file service end;
   comparing, by the userspace process, the first modification time information with the second modification time information;
   in response to the first modification time information and the second modification time information being inconsistent based on the comparing, returning a verification invalidation result to the kernel module;

invalidating, by the kernel module, the data in the kernel module, according to the verification invalidation result;
deleting, by the kernel module, the invalidated data in the kernel module;
in response to the first modification time information being consistent with the second modification time information, returning a verification validation result to the kernel module;
determining, by the kernel module, that data in the kernel module is valid according to the verification validation result;
synchronizing, by the userspace process using the valid data, the data in the file service end to the kernel module; and
in response to the kernel module sending a data shutdown request to the userspace process, caching dirty data to obtain cached data and updating the second modification time information of the cached data in the file service end after writing the cached data back to the file service end.

8. The electronic device of claim 7, wherein obtaining, by the userspace process, the second modification time information of the data corresponding to the data calling request, from the second metadata information stored in the file service end comprises:
sending, by the userspace process, a metadata information request of data to the file service end, to cause the file service end to return, according to the metadata information request, the second metadata information of the data corresponding to the data calling request to the userspace process; and
obtaining, by the userspace process, the second modification time information of the data corresponding to the data calling request, from the second metadata information.

9. The electronic device of claim 7, wherein the acts further comprise:
calling, by the userspace process, the data from the kernel module.

10. The electronic device of claim 7, wherein the acts further comprise:
in response to the kernel module sending a data shutdown request to the userspace process, caching, by the userspace process, dirty data in the kernel module to obtain cached data; and
writing, by the userspace process, the cached data back to the file service end.

11. The electronic device of claim 10, wherein the acts further comprise:
in response to the kernel module sending a cache ending request to the userspace process, determining, by the userspace process, that the dirty data in the kernel module is written back completely; and
ending the caching.

12. The electronic device of claim 10, wherein the dirty data is new data after the data corresponding to the data calling request is modified.

13. A non-transitory computer readable storage medium storing computer executable instructions, the computer executable instructions, upon running by a processor, causing the processor to perform acts comprising:
sending a data calling request of an application end to a kernel module to process the data calling request, wherein a filesystem in a userspace includes the kernel module and a userspace process;
in response to the kernel module, forwarding the data calling request to the userspace process;
in response to the forwarding the data calling request, obtaining, by the userspace process, first modification time information of data corresponding to the data calling request from a first metadata information stored locally and second modification time information of the data corresponding to the data calling request from second metadata information stored in a file service end, wherein the first modification time information indicates modification time information of data in the kernel module, and the second modification time information indicates modification time information of data in the file service end;
comparing, by the userspace process, the first modification time information with the second modification time information;
in response to the first modification time information and the second modification time information being inconsistent based on the comparing, returning a verification invalidation result to the kernel module;
invalidating, by the kernel module, the data in the kernel module, according to the verification invalidation result;
deleting, by the kernel module, the invalidated data in the kernel module;
in response to the first modification time information being consistent with the second modification time information, returning a verification validation result to the kernel module;
determining, by the kernel module, that data in the kernel module is valid according to the verification validation result;
synchronizing, by the userspace process using the valid data, the data in the file service end to the kernel module; and
in response to the kernel module sending a data shutdown request to the userspace process, caching dirty data to obtain cached data and updating the second modification time information of the cached data in the file service end after writing the cached data back to the file service end.

14. The non-transitory computer readable storage medium of claim 13, wherein obtaining, by the userspace process, the second modification time information of the data corresponding to the data calling request, from the second metadata information stored in the file service end comprises:
sending, by the userspace process, metadata information request of data to the file service end, to cause the file service end to return, according to the metadata information request, the second metadata information of the data corresponding to the data calling request to the userspace process; and
obtaining, by the userspace process, the second modification time information of the data corresponding to the data calling request, from the second metadata information.

15. The non-transitory computer readable storage medium of claim 13, wherein the acts further comprise:
calling, by the userspace process, data from the kernel module.

* * * * *